(12) United States Patent
Kleinmann et al.

(10) Patent No.: US 11,554,838 B1
(45) Date of Patent: Jan. 17, 2023

(54) MANEUVERING AND CONTROL SIMULATOR FOR UNDERWATER VEHICLES

(71) Applicant: The United States of America, as represented by the Secretary of the Navy, Arlington, VA (US)

(72) Inventors: Roger J. Kleinmann, Rockville, MD (US); Alexander S. Tsarev, North Potomac, MD (US); Jeeven B. Hugh, Germantown, MD (US); Jennifer M. Nunes, Cabin John, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 290 days.

(21) Appl. No.: 16/871,624

(22) Filed: May 11, 2020

(51) Int. Cl.
  *B63B 79/20* (2020.01)
  *B63B 79/15* (2020.01)
  *B63B 21/66* (2006.01)
  *B63G 8/00* (2006.01)
  *G01V 1/38* (2006.01)

(52) U.S. Cl.
  CPC .............. *B63B 79/20* (2020.01); *B63B 21/66* (2013.01); *B63B 79/15* (2020.01); *B63G 8/001* (2013.01); *G01V 1/38* (2013.01); *B63G 2008/004* (2013.01)

(58) Field of Classification Search
  CPC ......... B63B 79/00; B63B 79/15; B63B 79/20; B63B 21/00; B63B 21/66; B63G 8/00; B63G 8/001; B63G 2008/004; G01V 1/00; G01V 1/16; G01V 1/24; G01V 1/38

USPC ..................... 701/21; 367/15, 16, 17, 19, 21
See application file for complete search history.

(56) References Cited

U.S. PATENT DOCUMENTS

| | | | |
|---|---|---|---|
| 6,618,321 B2 * | 9/2003 | Brunet | G01V 1/3835 367/19 |
| 7,778,109 B2 * | 8/2010 | Storteig | G01V 1/38 367/16 |

(Continued)

OTHER PUBLICATIONS

Poster entitled "Maneuvering and Control Simulator for Underwater Vehicles (MACSUV)," poster prepared by co-inventor Alexander S. Tsarev and approved for public release on Apr. 24, 2020 by the United States Navy (NSWCCD).

*Primary Examiner* — Lars A Olson
(74) *Attorney, Agent, or Firm* — Howard Kaiser

(57) ABSTRACT

The main components of an exemplary inventive simulation are a towing platform (such as a ship), a towed body, an underwater vehicle (such as a UUV), and a tow cable connecting the towing platform and the towed body. An objective of the dynamic arrangement of the components is to perform a "line capture" of the moving vehicle by the cable. Respective motions and positions of the towing platform and the towed body affect the cable. Waves and currents in the water, as well as changes in catenary and tension of the cable, affect the tow body. Advantageously, the invention more accurately accounts not only for continuities, but also for discontinuities, characterizing the dynamic interrelationships between and among the components. Among the invention's features is its ability to "trigger" consideration of certain dynamic manifestations relating to the vehicle, depending on whether or not the vehicle is in a captured state.

15 Claims, 14 Drawing Sheets

(56) References Cited

U.S. PATENT DOCUMENTS 8,942,964 B2   1/2015  McWilliams, III
9,001,616 B2 *  4/2015  Visseaux ............. G01V 1/3835
                                                   367/19

* cited by examiner

Block Parameters: Dynamic Cable

The cable is split into "regions" of unique physical properties. Each region is split into elements which are used to solve the cable dynamics.

Cable parameters | External loads

- Initial cable pitch (deg): 100
- Max Calculated Force (lb): 1.0e4
- Structural Damping (%): 10

Region Definition

Number of element regions: 1

Region 1

- Number of elements: 10
- Overall length (ft): 25
- Diameter (in): 0.3
- Weight per unit length (lb/ft): 0.065
- mass per unit length (slugs/ft): 0.0075
- Elastic modulus (lb/ft^2): 4.9e7
- Normal drag coefficient: 1.7
- Hydrodynamic loading function: Eames
  - Eames' friction ratio: 0.008
  - Pode's friction factor: 0.01

Cable Summary

Total elements: 10
Total nodes: 11
Cable length: 25 ft
Cable weight: 1.625 lb

OK | Cancel | Help | Apply

MANEUVERING AND CONTROL SIMULATOR FOR UNDERWATER VEHICLES

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

The present invention relates to computer simulation of marine vehicles, more particularly to computer simulation of an underwater vehicle with respect to maneuvering and control of the underwater vehicle.

Model testing is the current industry-preferred approach for observing underwater vehicle maneuverability. Model testing is usually effective but can take months or years to prepare, and is the most expensive approach. Furthermore, when model testing leads to major design changes, models may be reconstructed and tested again to verify their performance. Accordingly, engineers often use computer simulations to identify design changes early.

A dynamics and controls simulator for underwater vehicles that the United States Navy currently uses is Dynamic Cable and Body (DCAB), a computer program developed by the Navy. DCAB utilizes an implicit solution method to solve for states of underwater vehicles, towed bodies, and cables (disregarding cable mass). While DCAB is effective in most scenarios, it cannot handle discontinuous dynamics—such as cable release or capture—because of its use of implicit methods. Generally, implicit methods rely on numerical convergence of states over continuous loads, but break down when impulse loads are applied, as the solver cannot converge.

Another simulator is OrcaFlex, a commercial product manufactured by Orcina Ltd. OrcaFlex is somewhat comparable to DCAB, and has the flexibility to use multiple solution methods that allow for a variety of scenarios. Nevertheless, OrcaFlex is not capable of discontinuous dynamics. Furthermore, the towed body model according to OrcaFlex does not achieve the same fidelity as does the Navy's DCAB.

SUMMARY OF THE INVENTION

In view of the foregoing, an object of the present invention is to provide a better methodology for simulating maneuvering and control of underwater vehicles.

Another object of the present invention is to provide a maneuvering and controls simulator for underwater vehicles that is capable of simulating discontinuous dynamics.

Exemplary inventive practice provides method, apparatus, and computer program product for simulating a marine towing-related operation in a graphical programming environment. Components and dynamics are represented in a system characterized by interrelationship. The system components include a towing platform, a towed body, and a tow cable. The tow cable has a first cable end and a second cable end. The tow cable is connected to the towing platform at the first cable end, and is connected to the towed body at the second cable end. The system dynamics include at least one of the following: an influence exerted upon the tow cable in association with a motion of the towing platform, and/or a position of the towing platform, and/or a motion of the towed body, and/or position of the towed body; an influence exerted upon the tow body in association with a catenary of the tow cable and/or a tension of the tow cable; an influence exerted upon the tow body in association with a hydrodynamic character of a marine environment, including waves and/or currents.

According to some inventive embodiments, the system components further include an underwater vehicle movable toward or away from the tow cable, and attachable or detachable with respect to the tow cable. When the underwater vehicle is attached to the tow cable, the system dynamics further include at least one of the following: an influence exerted upon the underwater vehicle in association with a catenary of the tow cable; an influence exerted upon the underwater vehicle in association with a tension of the tow cable; an influence exerted upon the tow cable in association with a motion of the underwater vehicle; an influence exerted upon the tow cable in association with a position of the underwater vehicle.

In accordance with exemplary practice of the present invention, time-domain computer simulations are provided of the hydrodynamic and inertial effects on unmanned underwater vehicles. Exemplary inventive simulations include, inter aba, environmental effects (e.g., waves and currents), control systems, and body-to-cable interactions.

An embodiment of the present invention was reduced to practice by the present inventors. The inventive prototype, which the present inventors named the "Maneuvering and Control(s) Simulator for Underwater Vehicles" ("MACSUV"), was created by the present inventors in order to simulate underwater vehicles, towed bodies, and cables, including controls and launch-and-recovery dynamics. The term "MACSUV," as used herein, broadly refers to any of a variety of inventive computer program embodiments encompassed by a mode of inventive practice that is based on same or similar principles as the present invention's MACSUV prototype.

This inventive MACSUV prototype contains a fully functional UUV controller block with robust PID control on depth, heading, roll, and speed. The UUV controller block has gains and parameters that control the simulated UUV's response to input commands and environmental effects like waves and currents. These controller gains and parameters can be easily tuned, within a simulation programming environment such as Simulink®, to optimize the control of the simulated UUV.

Furthermore, in accordance with exemplary practice of the present invention's MACSUV, the entire UUV controller block can be autocoded to generate C or C++ code for flashing to a real UUV's microcontroller. This process of tuning the controller gains and parameters in MACSUV and then autogenerating C code for a real UUV's microcontroller was proven successful on the AUV. Both time and money can be saved by tuning controller gains and autogenerating controller code before in-water runs take place. This ensures that the in-water runs start with a close-to-optimal set of controller gains, which may require little-to-no tuning.

The inventive MACSUV simulator can also be embodied to contain a waypoint mode in which the user specifies waypoints in 3D space and the UUV will automatically travel to the waypoints. This inventive feature is useful to simulate line capture and homing, lawnmower patterns, and other complex patterns.

Moreover, an exemplary MACSUV contains a wave environmental model component and a current environmental model component. The wave model component simulates the effects of a variety of wave spectrums, including Ochi-Hubble and Bretschneider, on the UUV. The current model component allows for a steady current at a specified direction or an oceanographic current input.

BRIEF DESCRIPTION OF THE DRAWINGS

The present invention will now be described, by way of example, with reference to the accompanying drawings, wherein like numbers indicate same or similar parts or components, and wherein:

FIG. 8 is an example of a screenshot of a user interface pertaining to cable parameters, in accordance with the present invention.

FIG. 9 is an example of a screenshot of a user interface pertaining to cable loads, in accordance with the present invention.

FIGS. 11, 13, and 15 are side elevation views. FIGS. 12, 14, and 16 are partial and enlarged top plan views. FIGS. 11 and 12 basically correspond to FIG. 4, wherein the UUV is distanced from the cable. FIGS. 13 and 14 basically correspond to FIG. 4, wherein the UUV is closer to the cable than as shown in FIGS. 10 and 11. FIGS. 15 and 16 basically correspond to FIGS. 5 and 6.

DESCRIPTION OF EXEMPLARY
EMBODIMENTS OF THE INVENTION

Figure 1:
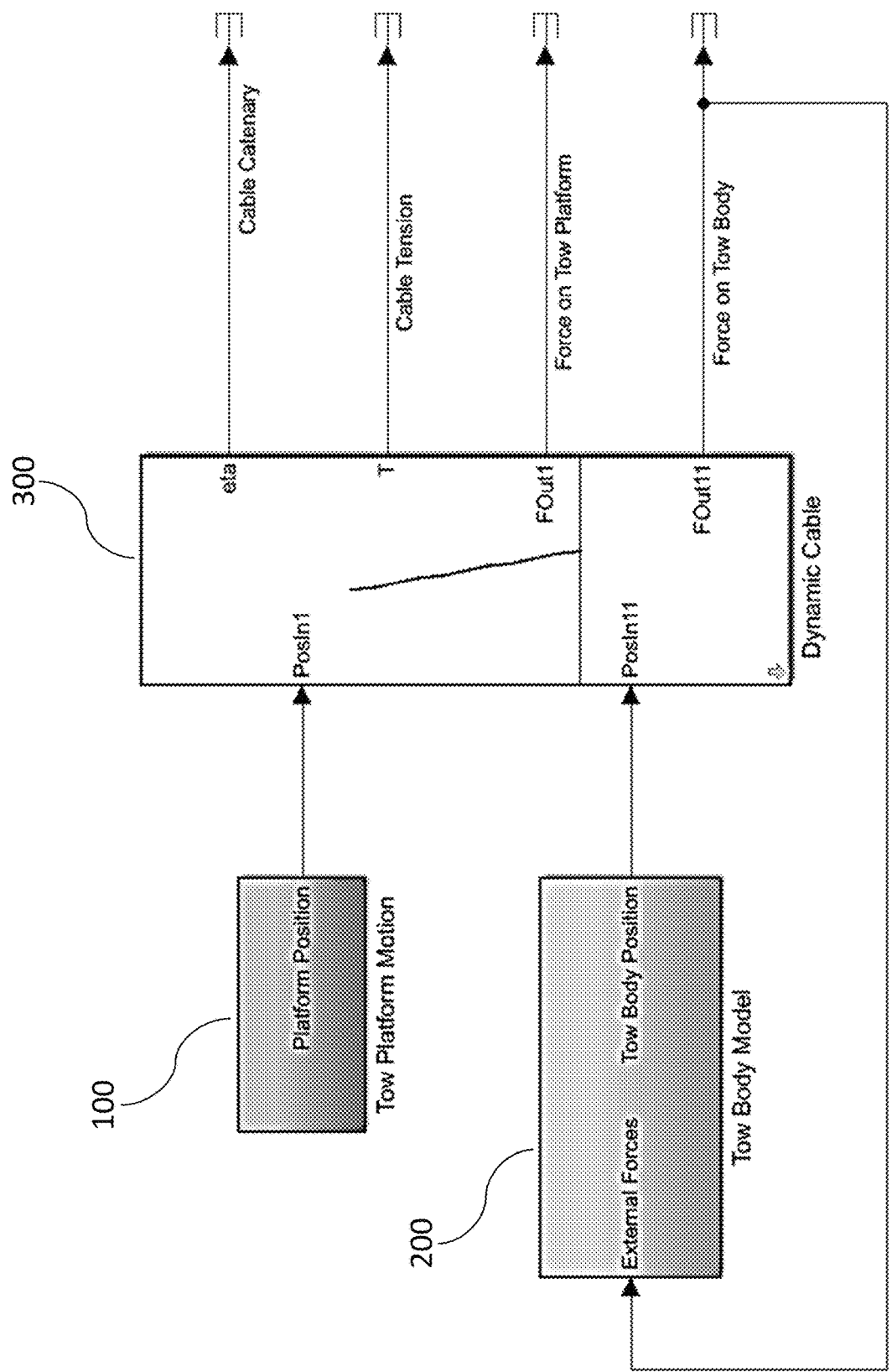
FIG. 1 is a diagram of an example, in accordance with the present invention, of a towing platform, a tow cable, and a towed body, and relationships therebetween, as implemented in a graphic programming environment (for instance, a Simulink® simulation programming environment). The towing platform, tow cable, and towed body are represented by blocks. The physical (e.g., force) interrelationships are represented by unidirectional arrowhead lines.

Referring now to FIG. 1, the present invention's MACSUV, as exemplarily embodied, includes a library of "blocks" (modules) within a simulation programming environment such as provided by Simulink®, a commercially available graphical programming environment for modeling and simulation of systems. Simulink® is a graphical extension of MATLAB®, a technical computing language developed by MathWorks®.

In accordance with exemplary inventive practice of a dynamics-and-controls simulator, bodies and cables are added to a workspace and then "wired" together to represent physical or sensed connections. This inventive approach allows the user to construct simulations, whether of high or low complexity, with the same toolset by simply connecting components with a virtual line.

FIG. 1 shows an inventive embodiment of MACSUV in which a tow cable 300 is connected to a towing platform 100 at one end of cable 300, and is connected to a towed body 200 at the other end of cable 300. The three main components—viz., towing platform 100, towed body 200, and tow cable 300—are graphically represented by corresponding blocks in a relational block diagram. Cable 300 is towed by platform 100 (e.g., a ship or other marine vessel) at a fixed speed, with towed body 200 attached to cable 300 at the opposite end.

Figure 2:
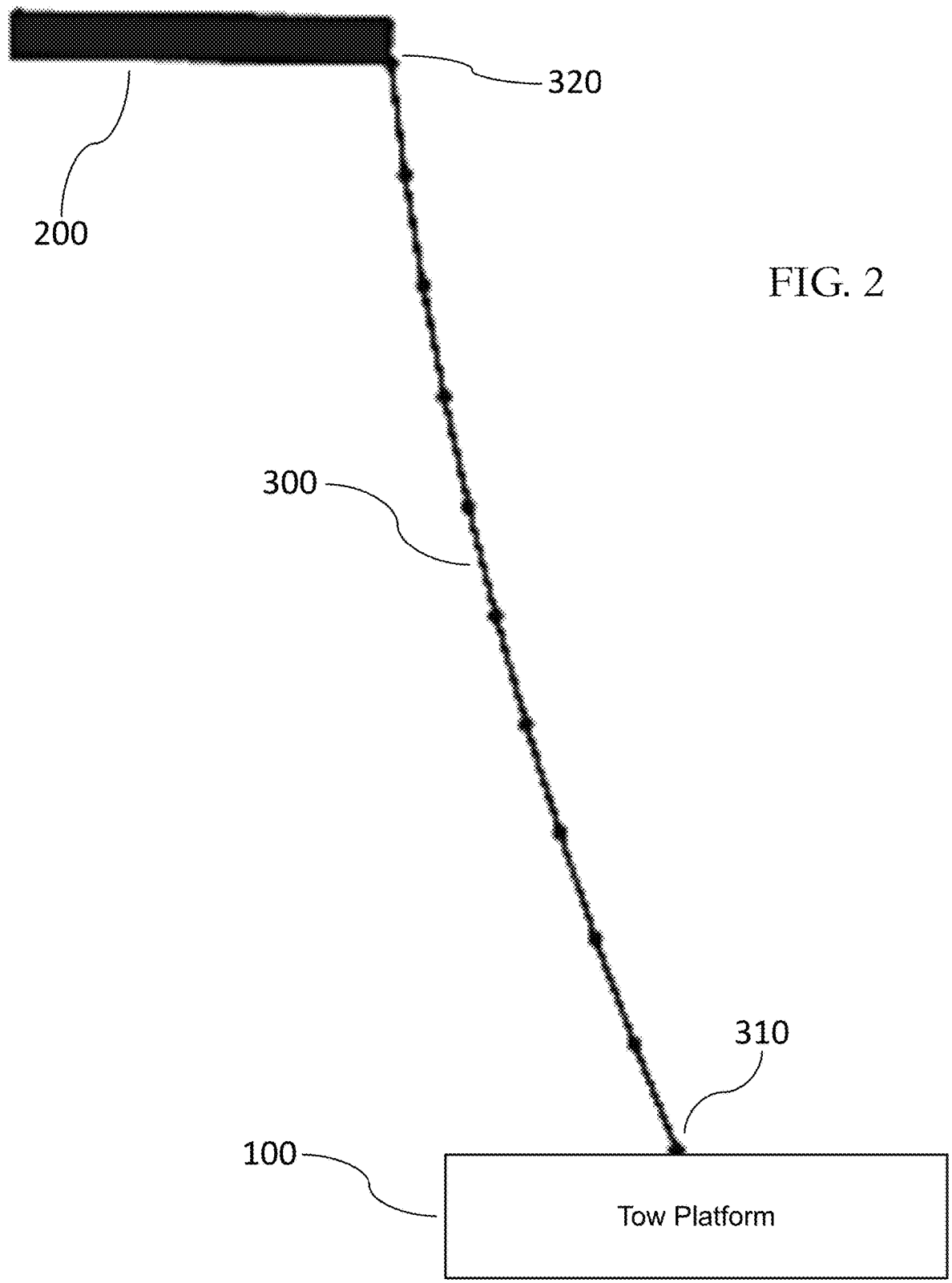
FIG. 2 is a diagram of an example, in accordance with the present invention, of a configuration of a towing platform, tow cable, and towed body, such as shown in FIG. 1, wherein the towing platform is traveling at a constant velocity.

Towed body 200 receives force feedback from cable 300, as the motion of towed body 200 is constrained by cable 300. However, in this case the platform 100 does not receive force feedback (as is shown in FIG. 1 by the absence of an input wire), because the combined forces (constraints) from the cable 300 and the towed body 200 are small relative to the platform 100's own hydrodynamic and inertial forces. FIG. 2 shows the steady-state result of the towed body 200 and the dynamic cable 300 (such as depicted in FIG. 1) as a two-dimensional plot, wherein the tow platform 100 is moving to the right.

Figure 6:
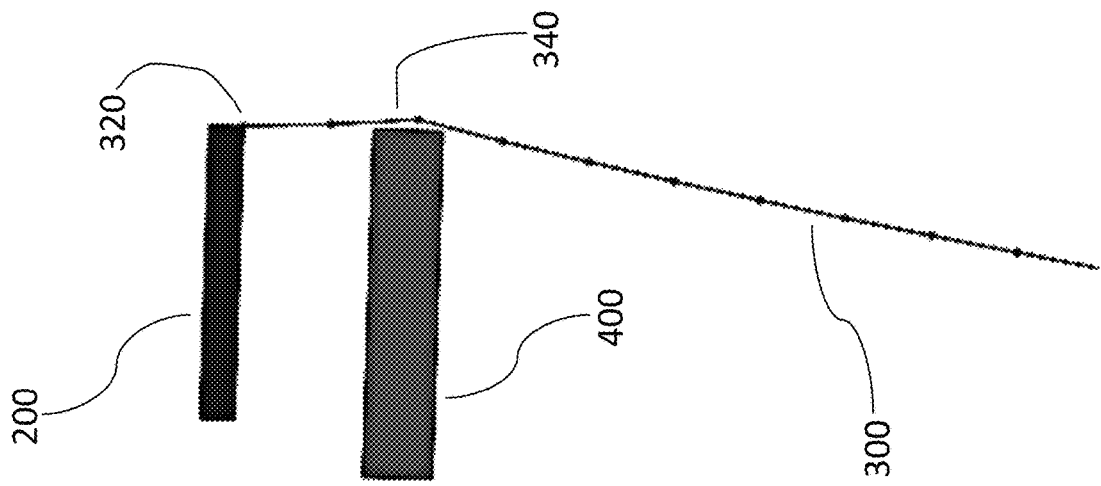
FIG. 6 is a diagram of an example, in accordance with the present invention, of a configuration of a tow cable, a towed body, and an underwater vehicle, after significant forward motion of the captured vehicle.
Figure 5:
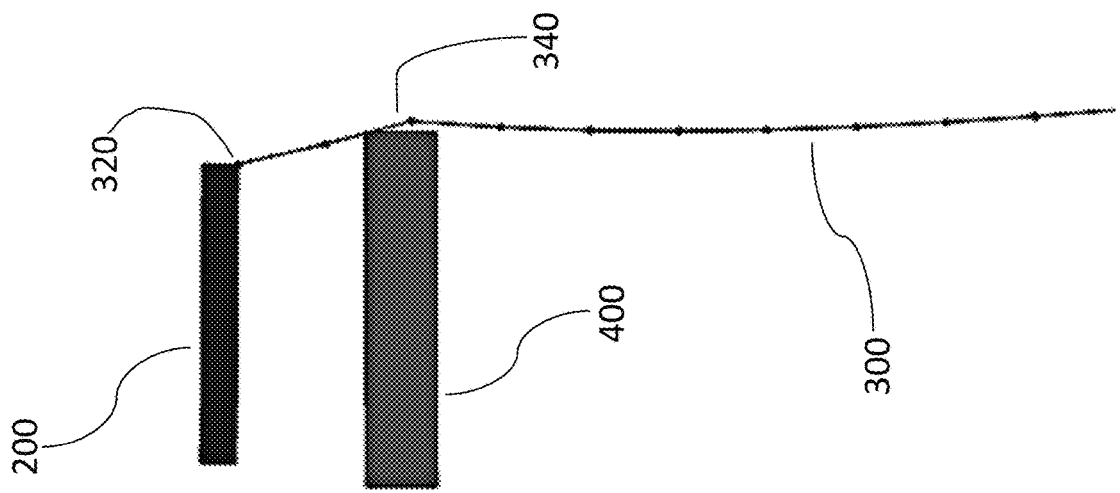
FIG. 5 is a diagram of an example, in accordance with the present invention, of a configuration of a tow cable, a towed body, and an underwater vehicle, shortly after capture of the vehicle by the cable.
Figure 4:
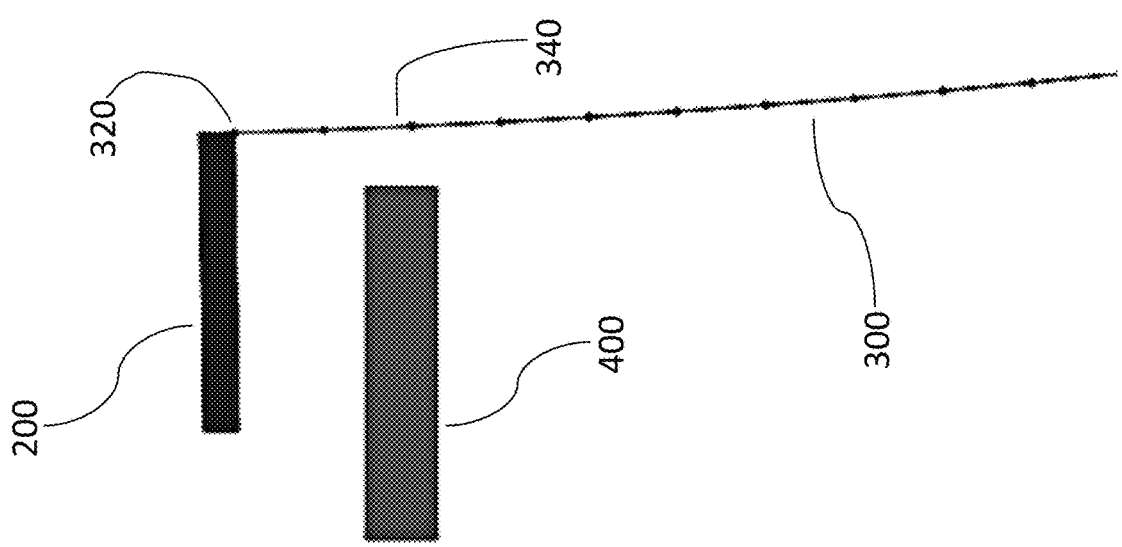
FIG. 4 is a diagram of an example, in accordance with the present invention, of a configuration of a tow cable, a towed body, and an underwater vehicle, on approach of the vehicle toward the cable.

FIG. 2 and FIGS. 4 through 6 are configurative diagrams showing components and connection points, viz.: a platform-cable tow point 310 (FIG. 2 and FIGS. 4 through 6); a body-cable tow point 320 (FIG. 2 and FIGS. 4 through 6); and a vehicle attachment point 340 (FIGS. 4 through 6). Platform-cable tow point 310 and body-cable tow point 320 are each a continuous connection, e.g., continuously engaged. Vehicle attachment point 340 is a discontinuous connection, e.g., either engaged or disengaged (exclusive disjunction).

Figure 3:
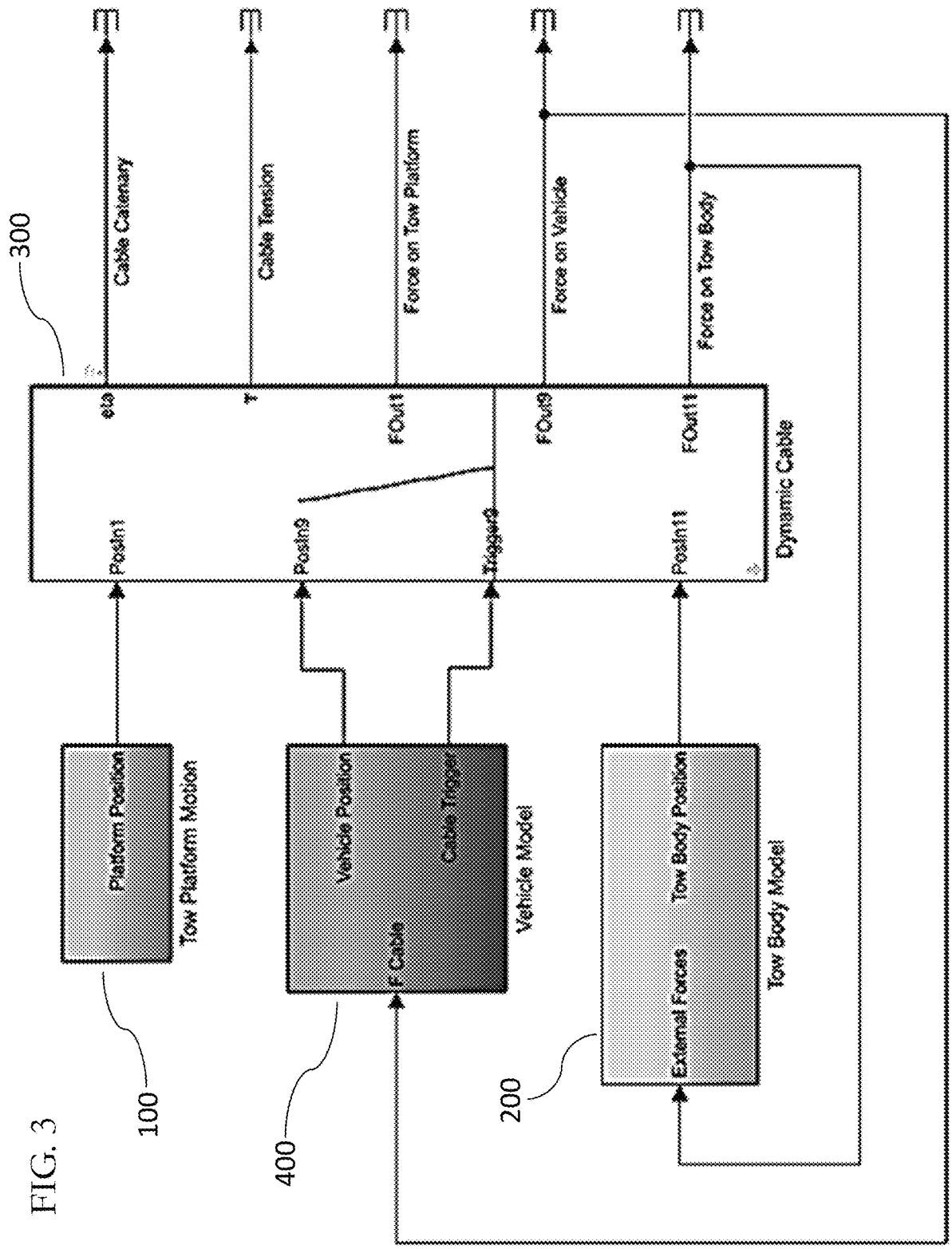
FIG. 3 is a diagram of an example, in accordance with the present invention, of a towing platform, a tow cable, a towed body, and an underwater vehicle, as implemented in a graphic programming environment (for instance, a Simulink® simulation programming environment). As distinguished from FIG. 1, FIG. 3 further includes a vehicle, which can engage the cable in a line capture scenario. The towing platform, tow cable, towed body, and vehicle are represented by blocks, and physical (e.g., force) relationships therebetween are represented by unidirectional arrowhead lines.

The scenario illustrated in FIGS. 1 and 2 does not involve a "capture" of one entity with respect to another entity. In contradistinction thereto is the line capture scenario illustrated in FIGS. 3 through 6, which represents another type of scenario suitable for inventive practice. The line capture scenario includes not only a towing platform 100, a towed body 200, and a tow cable 300, but also includes an underwater vehicle 400. As shown in FIG. 3, a vehicle 400 (e.g., UUV) attaches midway (or approximately midway) along the cable 300.

Similarly as shown in FIG. 1, as shown in FIG. 3 neither towed body 200 nor cable 300 exerts a significant force (constraint) upon towing platform 100. In addition, as shown in FIG. 3, vehicle 400 does not exert a significant force (constraint) upon towing platform 100. The constraint imposed upon cable 300 by towing platform 100 is manifested in one input, viz., the position of towing platform 100. Similarly, the constraint imposed upon cable 300 by towed body 200 is manifested in one input, viz., the position of towed body 200. In contrast, the constraint imposed upon cable 300 by vehicle 400 is manifested in two inputs, viz., (i) the position of vehicle 400, and (ii) a "trigger."

That is, as distinguished from towing platform 100 and towed body 200, vehicle 400 shown in FIG. 3 exerts its influence upon cable 300 not only in terms of the position of the exerting object, but also in terms of the attached-versus-detached condition of the exerting object with respect to cable 300. As pertains to vehicle 400, the constraint upon cable 300 has both a vehicle 400 position input and a vehicle 400 "trigger" input. According to exemplary inventive practice, a trigger input is not present for continuous connections (such as platform-cable tow point 310 and body-cable tow point 320). Rather, a trigger input is present for discontinuous connections (such as vehicle-to-cable attachment point 340 in a line capture scenario).

The trigger input is a logical value (e.g., 1 or 0) indicating whether or not vehicle 400 is attached to cable 300. If vehicle 400 is not attached to cable 300, then the relationship between cable 300 and vehicle 400 is ignored. Effects caused by and visited upon the vehicle are irrelevant while the vehicle is disconnected from the cable, but are "triggered" into relevance while the vehicle is connected to the cable; these effects include motion and position of the vehicle as affecting the cable, catenary and tension of the cable as affecting the vehicle, and waves and currents as affecting the vehicle.

FIGS. 4, 5, and 6 illustrate examples of outcomes of the present invention's line capture simulation shown in FIG. 3. As shown in FIG. 4, the cable 300 and the towed body 200 have maintained steady motion at a constant velocity, with the vehicle 400 approaching. FIG. 5 depicts a short instance after line capture, when the vehicle 400 has overtaken the cable 300 and is moving forward. FIG. 6 depicts the system several seconds later, when the vehicle 400 is forward of the tow point 130. As shown in FIG. 6, the catenary of cable 300 can be seen as a linear or curvilinear continuum of distinct segments, located above and below the vehicle attachment point 340.

Figure 7:
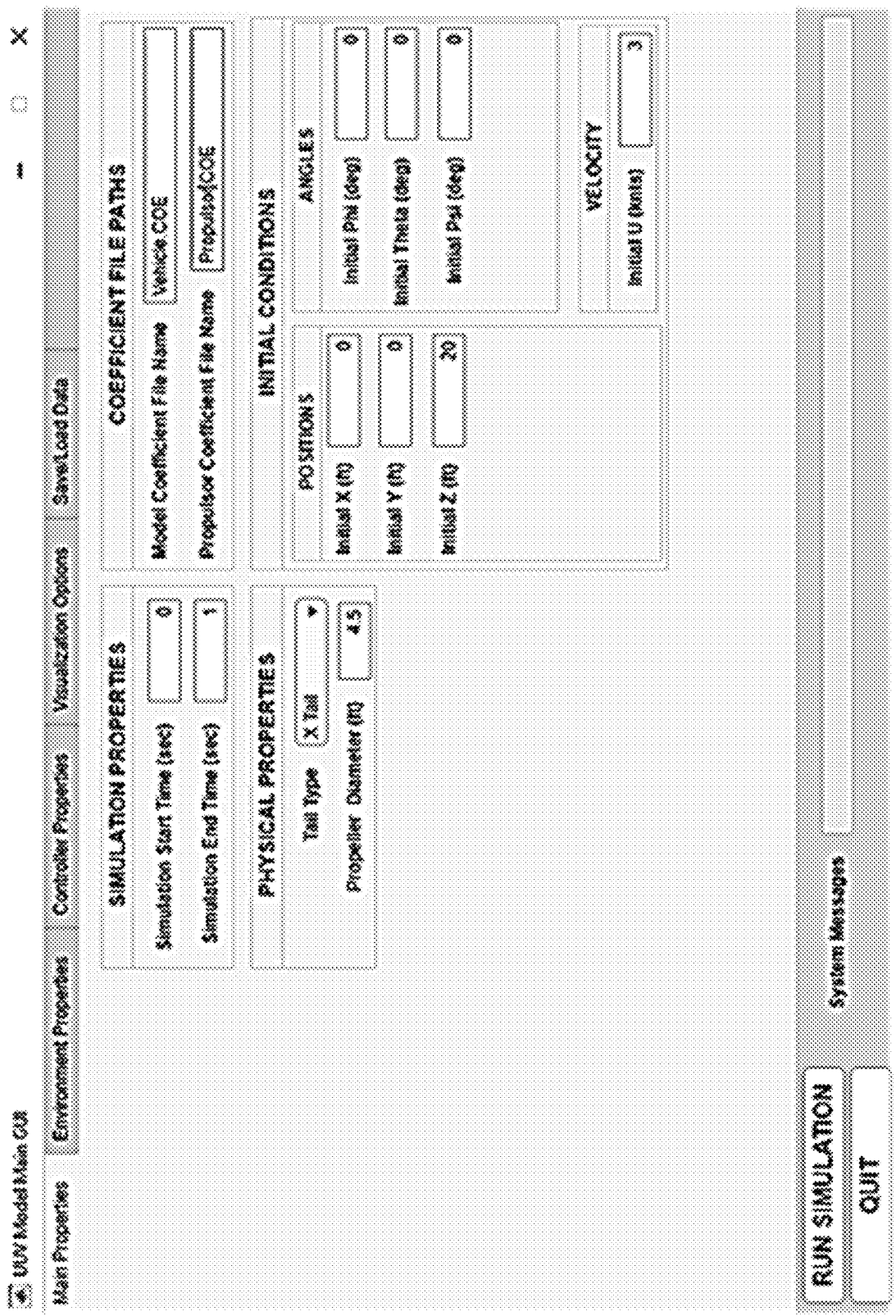
FIG. 7 is an example of a screenshot of a user interface pertaining to vehicle parameters, in accordance with the present invention.
Figure 10:
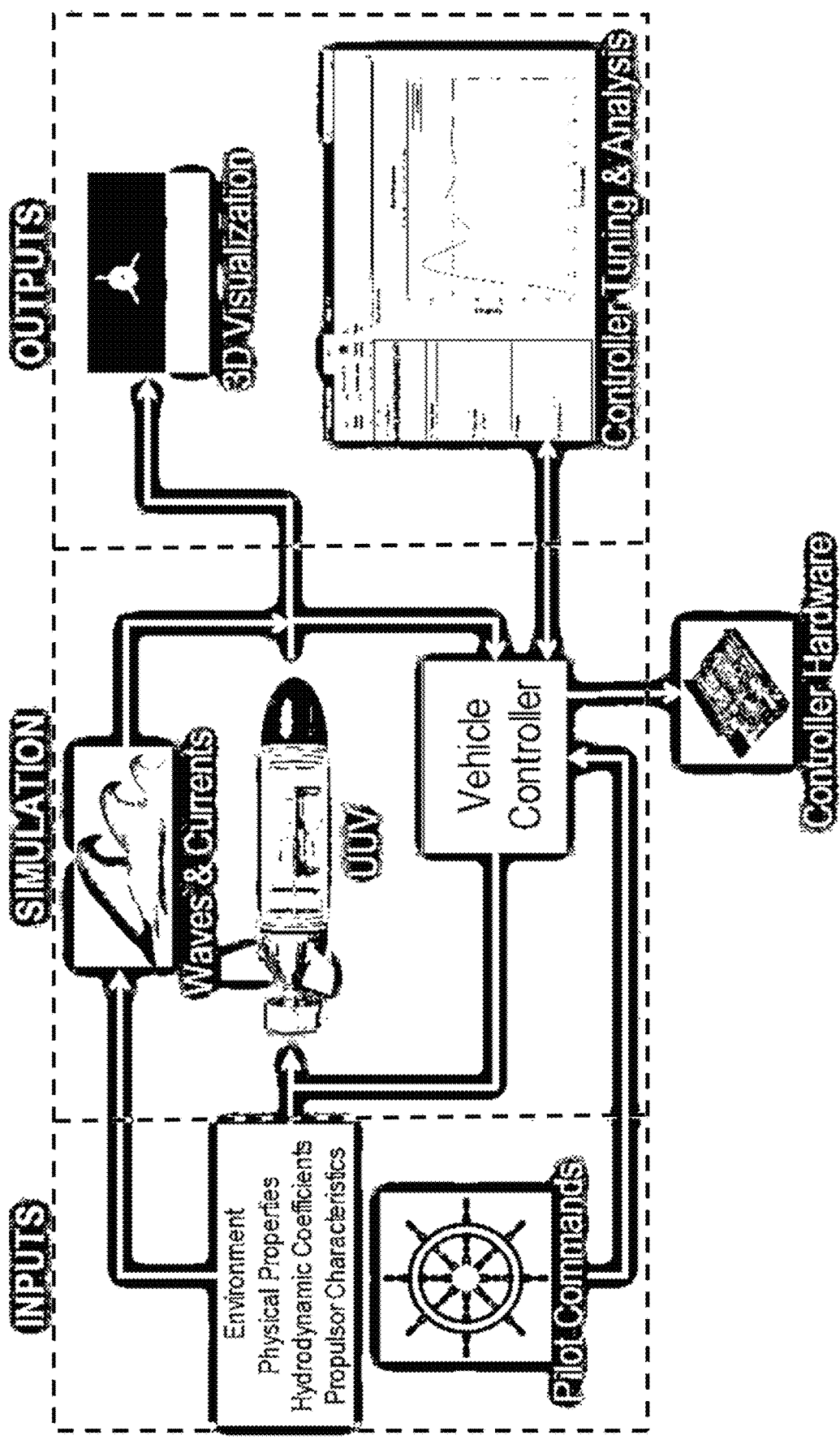
FIG. 10 is a schematic showing inputs, simulation, and outputs in accordance with exemplary practice of the present invention.
Figure 11:
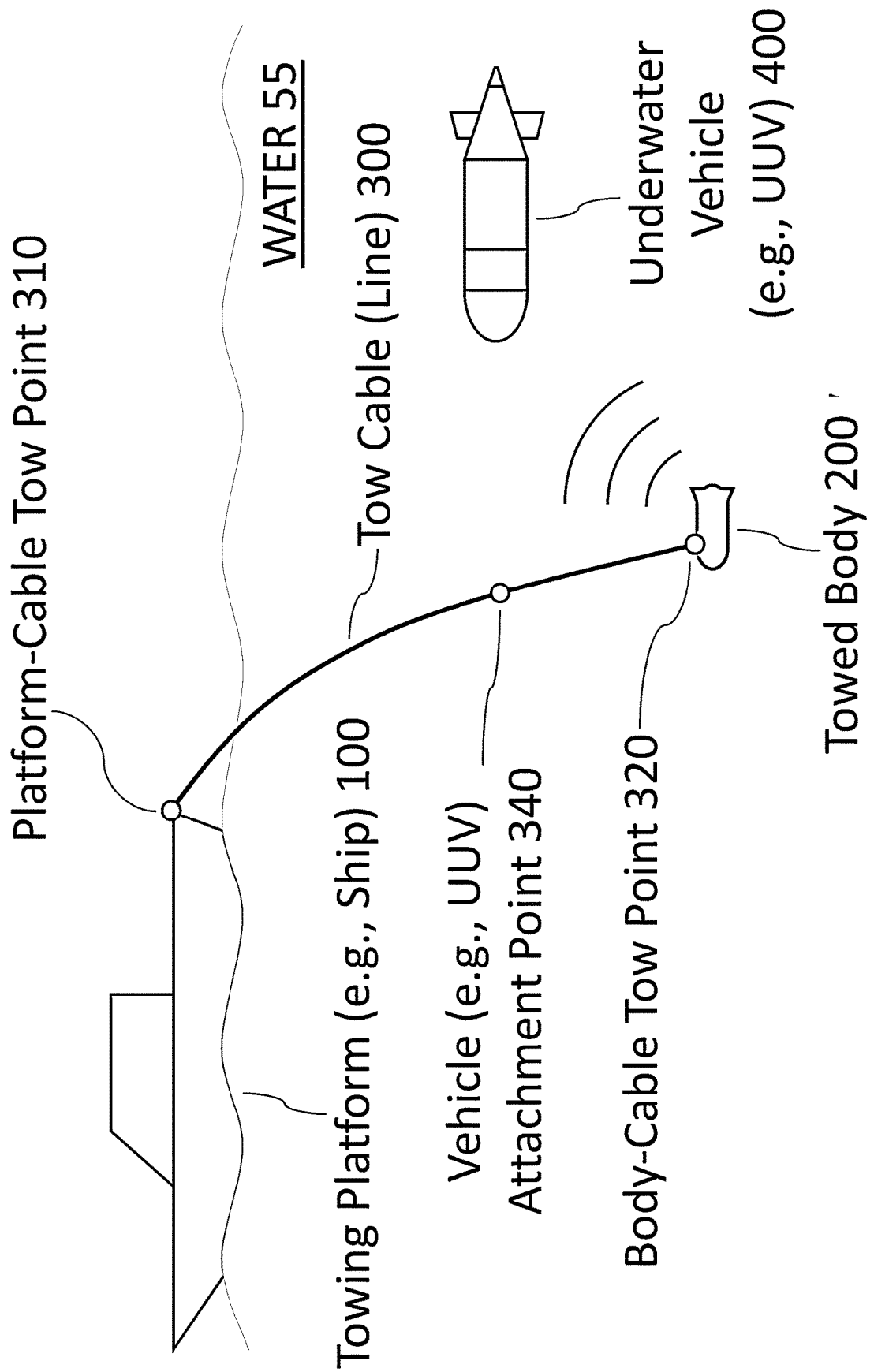
FIGS. 11 through 16 are diagrammatic elevation and plan views sequentially illustrating an example of a line capture of an unmanned underwater vehicle (UUV) with respect to a cable that is connected at its upper end to a ship and at its lower end to a tow body. Among other types of scenarios, a scenario of this nature is suitable for simulation of dynamics and controls in accordance with the present invention.
Figure 12:
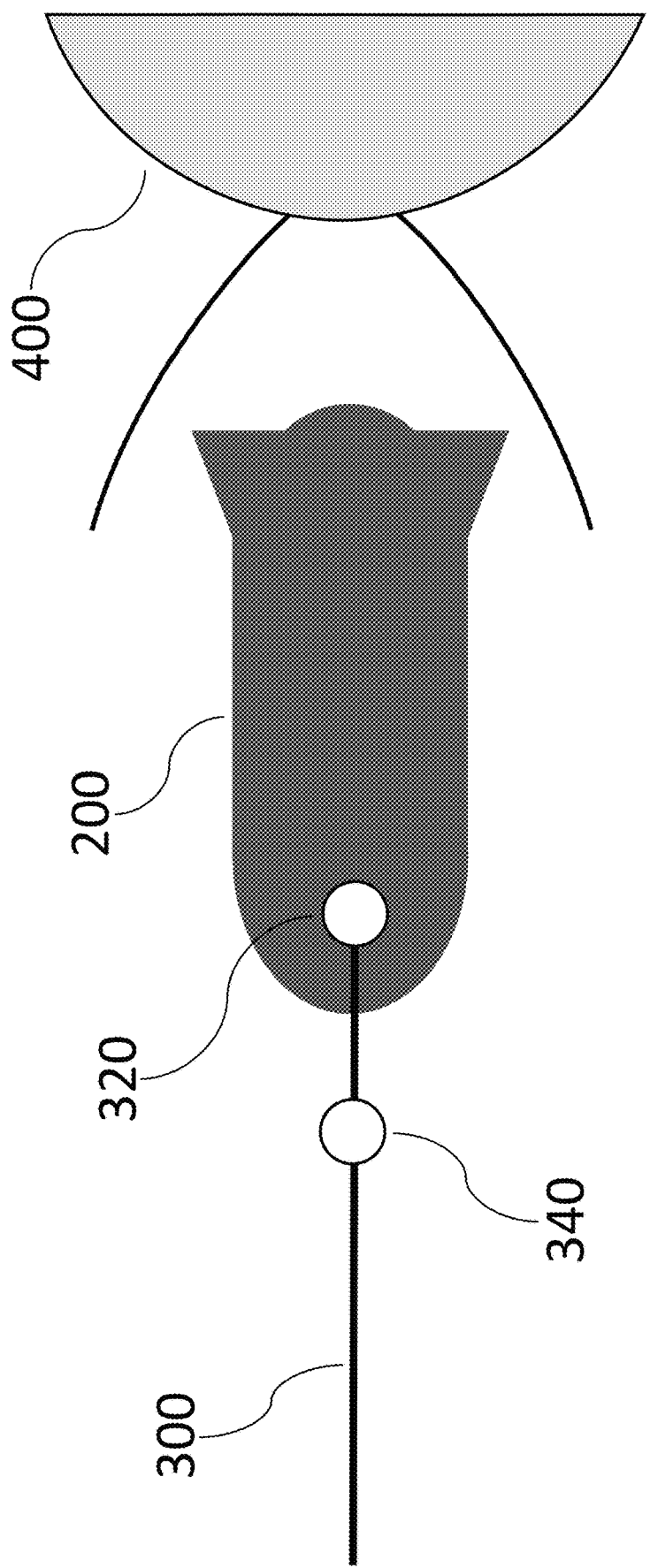
Figure 13:
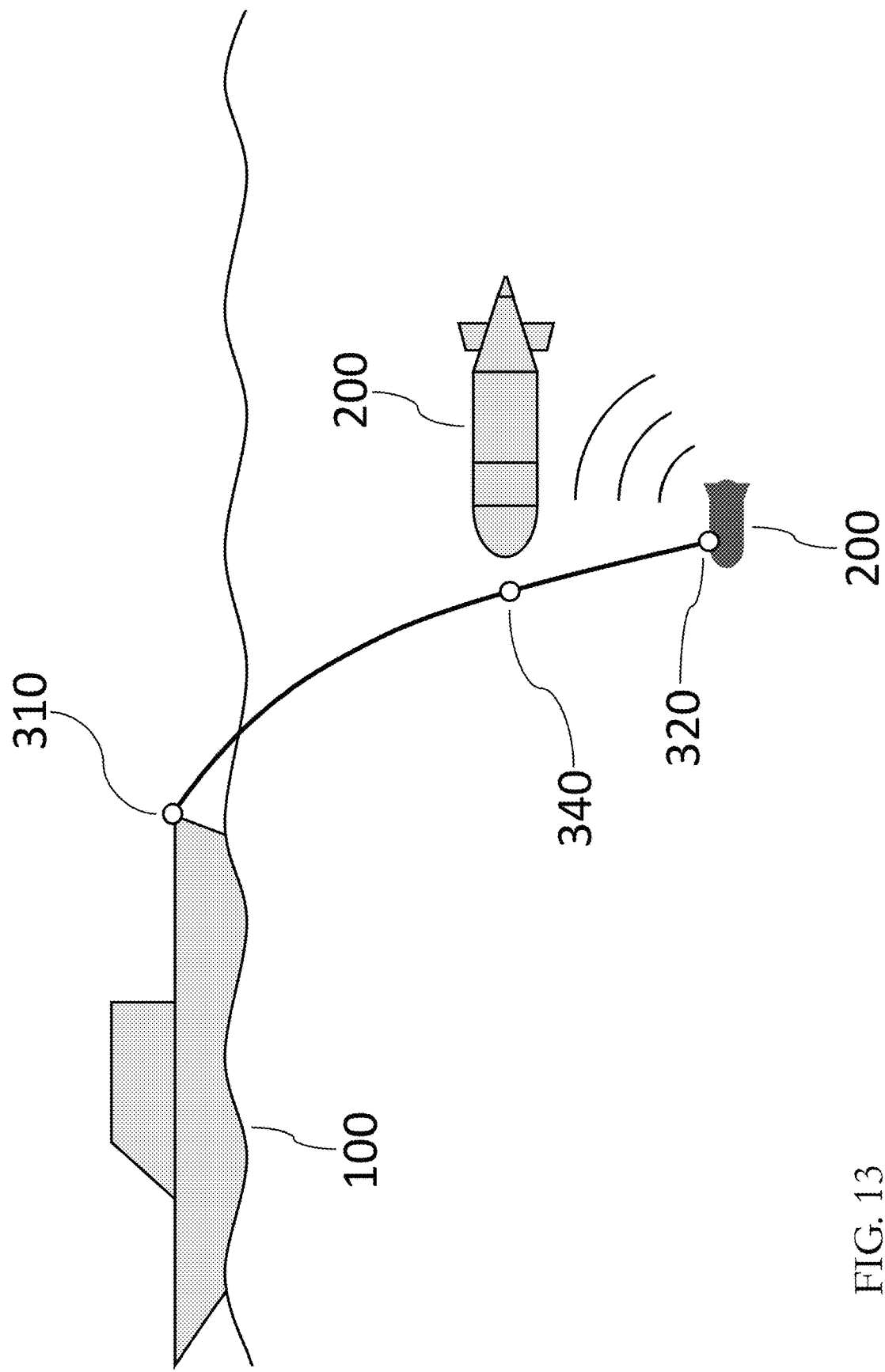
Figure 14:
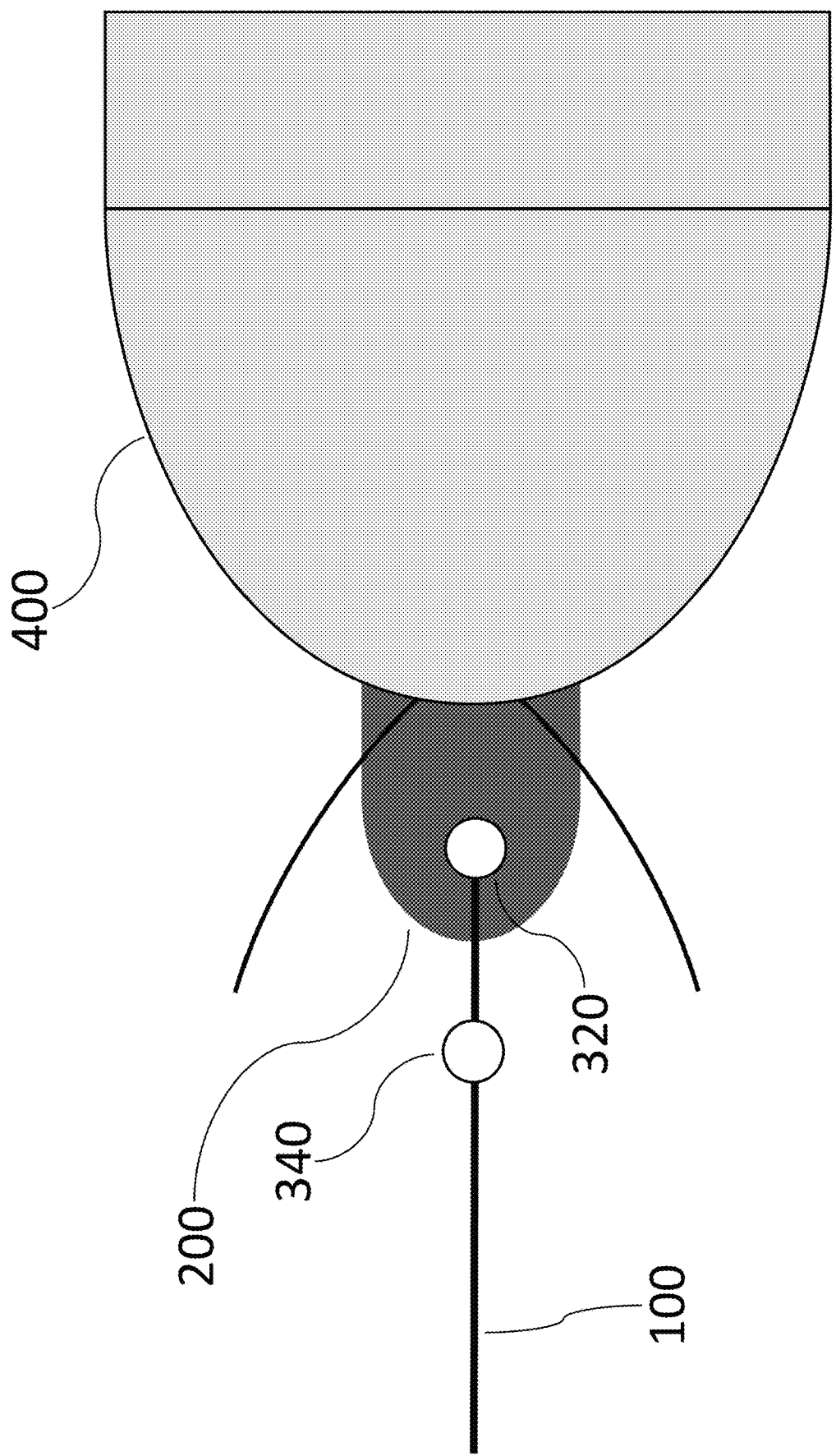
Figure 15:
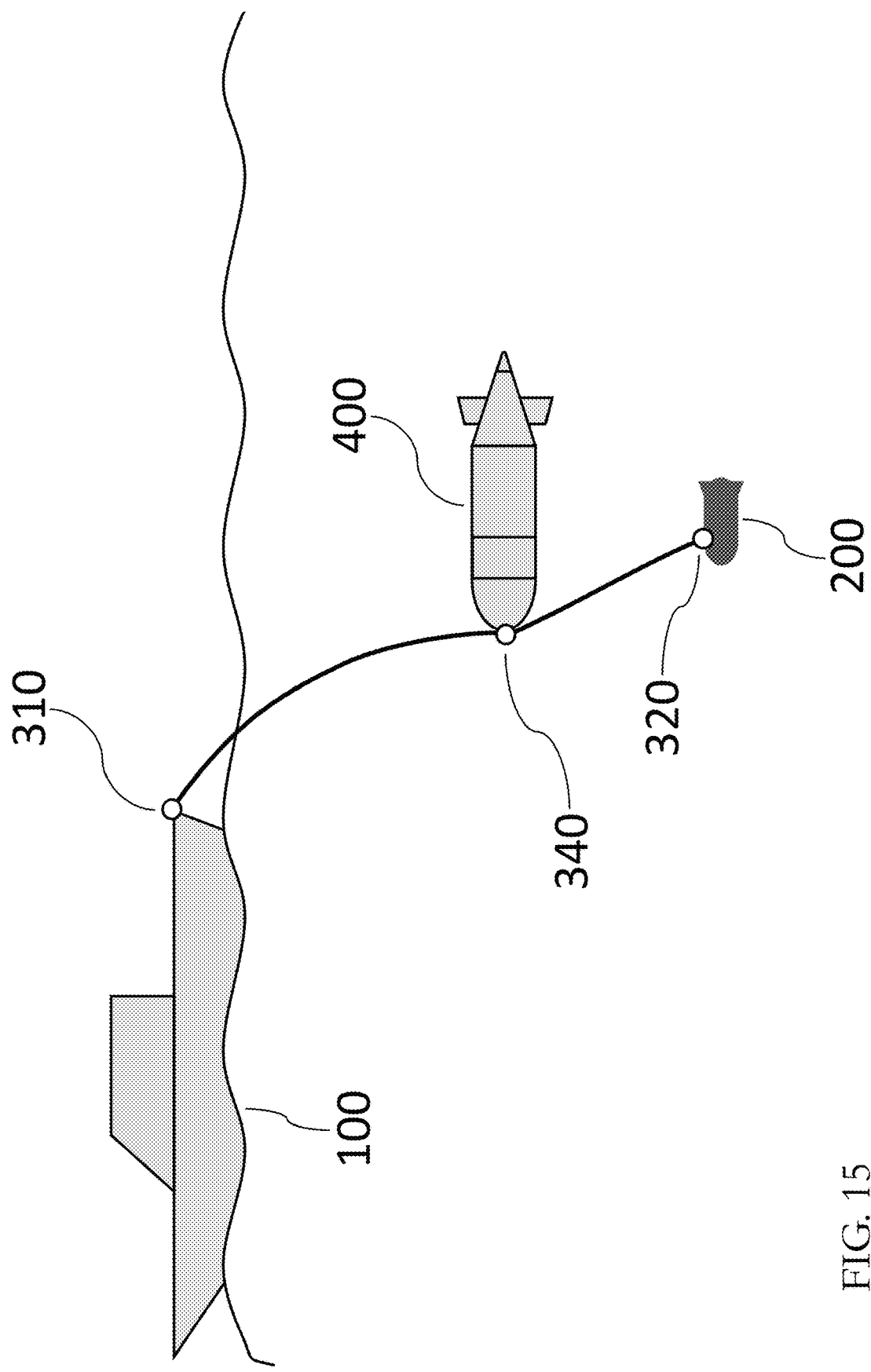
Figure 16:
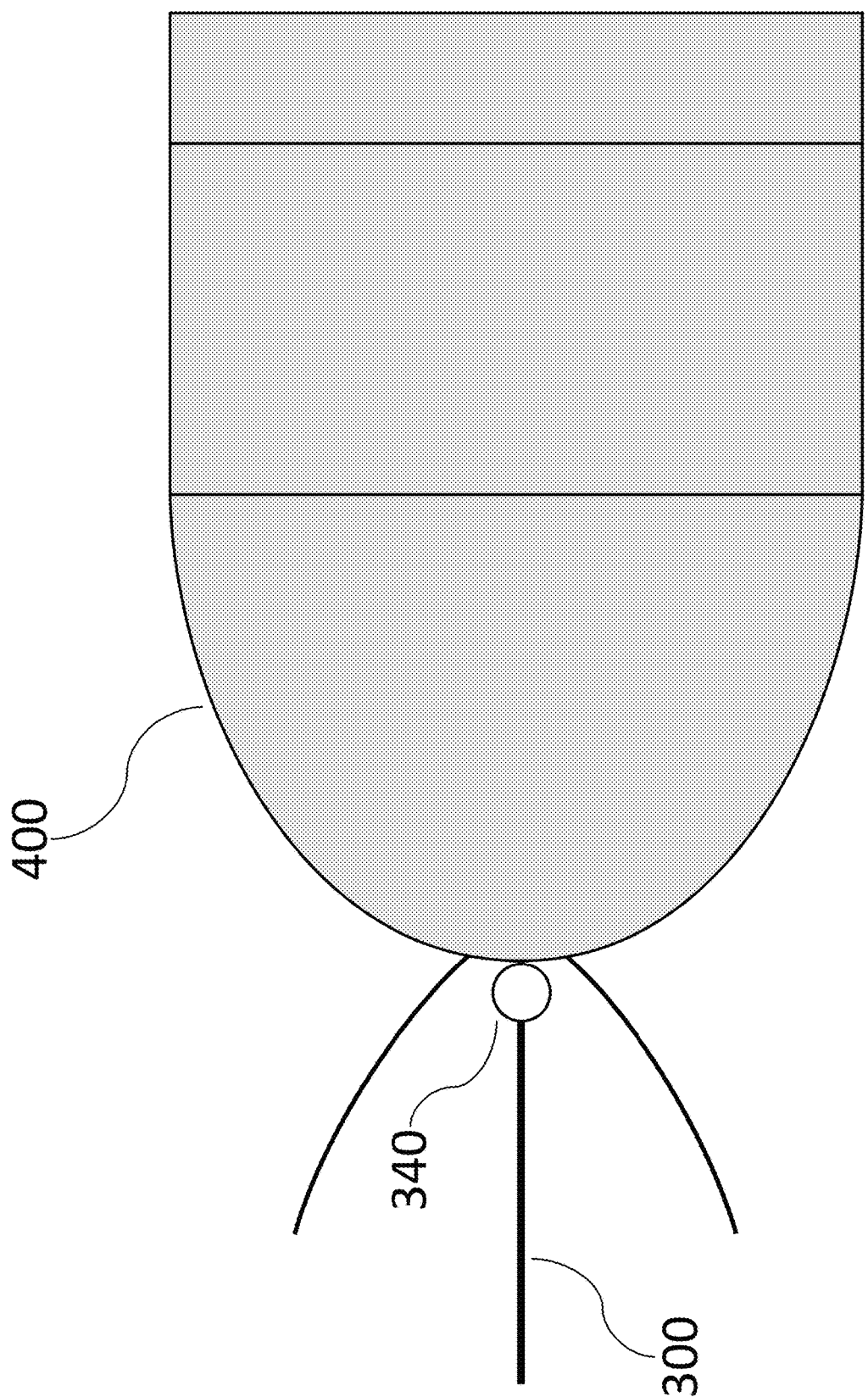

With reference to FIGS. 7 through 10, in accordance with exemplary inventive practice a vehicle 400 can be configured within its own user interface wherein simulation, controller, and environmental properties are defined. By way of example of inventive practice, the main panel of the user interface is shown in FIG. 7. In accordance with many embodiments of the present invention, the cable block is defined similarly as shown in FIG. 7.

Figure 9:
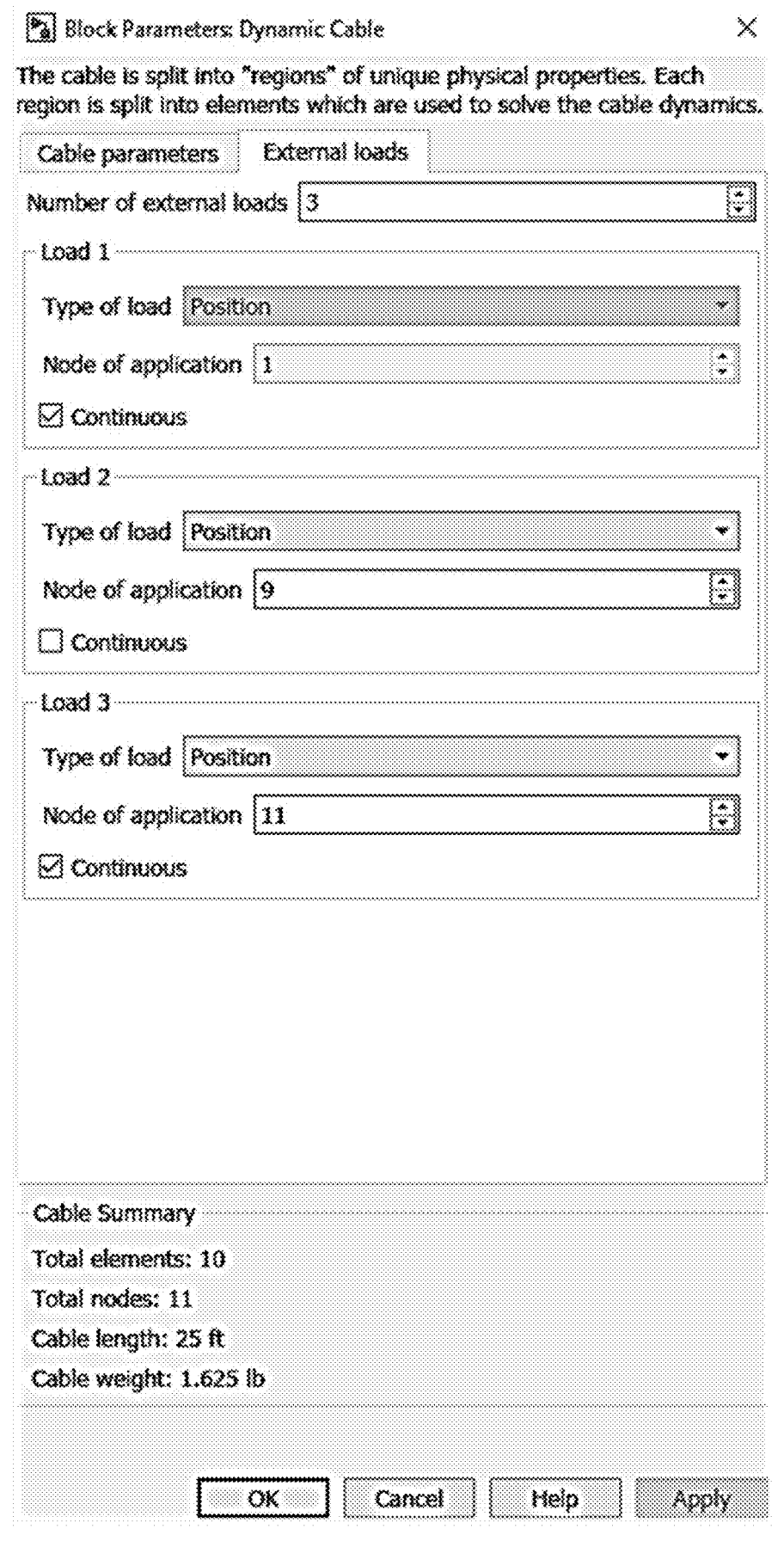

FIG. 8 shows the tab in which cable properties are set, including mass, length, elasticity, and drag characteristics. Furthermore, multiple "regions" can be defined along the cable with difference properties. For instance, a cable could have a 20-foot region of fairings aft of the tow point 130, followed by a 30-foot unfaired region. FIG. 9 shows how loads are added and defined. Position loads are used when the connected object is significantly larger than a single cable element, and that body is therefore considered a "driving" load. Forces are used when interactions are with small bodies (such as drogues) or elastic connections.

An inventive MACSUV, as exemplarily embodied, is a program that provides a time-domain simulation of entities and phenomena such as towing platforms (e.g., ships), towed bodies, underwater vehicles (e.g., UUVs), moored bodies, tow cables, and cable hydrodynamic responses due to factors including vehicle controller inputs, waves, and currents. An exemplary inventive simulation uses a coefficient-based approach to calculate the external hydrodynamic forces acting on the components. Cables are modeled, for example, as linked spring-mass-damper elements. Exemplary inventive practice is capable of simulating discontinuous events, and admits of a variety of boundary conditions for multi-body and/or multi-cable configurations. According to exemplary inventive practice, a visualization module provides a 3D rendering of vehicular motions and line plots of time history data as the simulation is running. An inventive MACSUV can be used, for instance, during the system design phase to evaluate vehicle performance, to design controller algorithms and gain schedules, in operation during sortie planning, or embedded into a simulator for training operators.

The inventive models described herein are merely examples of the present invention's MACSUV functionality, but they do not define the limitations of the inventive simulator. Other possibilities for inclusion in inventive simulation include but are not limited to multi-cable moored buoys, cable failure/release, and multiple towed bodies on one cable. The MACSUV blocks are flexible enough so that even very complex scenarios can be constructed.

One of many possible uses for an inventive MACSUV is to simulate and predict behavior of moored energy harvesting systems. For instance, an energy harvesting system may include a moored turbine attached, by one or multiple cables, to the seafloor. Harvesting systems utilize waves and/or currents to convert to stored energy, and therefore will be heavily influenced hydrodynamically by such waves and/or currents. An inventive MACSUV can observe moored body motions, cable catenaries, and force/tension behavior(s) during energy harvesting in various wave and current environments.

The present invention's MACSUV, as exemplarily embodied, introduces the new capability of quickly simulating cable-to-body interactions during launch and recovery of an underwater vehicle. According to exemplary inventive practice, this is done through a hybrid explicit/implicit numerical solver, wherein the present invention takes both an explicit type of approach and an implicit type of approach. Generally, typical explicit solvers use small fixed time steps to solve the forward Euler equation (discretely integrating forces to calculate the next state of the system). The present invention's MACSUV performs a kind of explicit approach, while varying the time step throughout the simulation by converging on a solution as a kind of implicit approach. The resulting program is a balanced series of physical models and assumptions that allow for static, dynamic, and discontinuous dynamic simulations.

With the existing tools of present-day practice, it is not possible to simulate discontinuous dynamics because implicit methods cannot handle the numerical error associated with impulses. According to conventional practice, in the instant that a contact is changed (through either a collision or separation of two bodies), the states of the objects do not agree numerically and so the calculated error is quite large. Implicit methods may be implemented to iterate steps in an attempt to converge on a solution, but convergence cannot occur because numerically the required time step is infinitesimally small. In contrast, the present invention's MACSUV does not experience this problem, as exemplary inventive practice provides a "hybrid" method that allows the inventive program to continue despite limited convergence.

In addition to the added capability of discontinuous dynamics, the present invention's MACSUV maintains much of the functionality that is expected of an underwater vehicle simulator. This functionality includes continuous body-and-cable behavior (such as a towed body connected to a tow cable), control system implementation and tuning (for vehicle maneuvering), free-running vehicle simulation, and cables without towed bodies. According to a test embodiment of an inventive simulator, the cable module within MACSUV does not use wave/current inputs, while the towed body module and the underwater vehicle module each do use wave/current inputs. For this reason, the cable acts as if it is in perfectly calm water. As may be reflected in future inventive testing, an inventive embodiment can include wave input along the cable, as this will help increase simulation accuracy—especially for line capture/release scenarios.

In furtherance of simplified simulative representation, according to some embodiments of the present invention the cable is initialized in a straight line at an angle defined by the user. Since velocity and tension are zero, the simulation is required to run for several seconds (defined as a "ramp period") so that the transient response associated with the slack cable can be attenuated. According to an alternative inventive approach, the user defines the initial position of specific points along the cable in 3D space. According to another inventive approach, a steady state solver is implemented to quickly remove the unwanted transient.

According to an inventive prototype MACSUV model, cable forces are resolved at a finite number of nodes along the cable. While the distance between nodes can be reduced, this nonetheless limits the number of attachment points 340 along the cable, and furthermore prevents the modeling of sliding contacts (such as a vehicle moving up or down the cable in the absence of a fixed attachment). Depending on the inventive embodiment, inventive practice can feature internodal contacts (so a body can attach between nodes) and even sliding contacts so bodies can be modeled translating along the cable.

Furthermore, according to a current prototype of MACSUV, the cable has a fixed length. However, according to some inventive embodiments, it may be desirable to see the dynamic effects of increasing or decreasing scope. For this reason, according to some inventive embodiments, another addition to the cable module would be the ability to model a winch.

The present invention's Maneuvering and Control Simulator for Underwater Vehicles (MACSUV) is capable of simulating multi-body coefficient-based systems. A novel feature provided by an exemplary inventive MACSUV is its ability to simulate discontinuities in cable dynamics (e.g. cable impacts from attaching and detaching bodies). This can be used in a variety of simulated scenarios including, but not limited to: attachment to a moored line; undersea towed system from a larger unmanned undersea vehicle (UUV); or surface towed system from a ship.

With reference to FIGS. 11 through 16, the example shown is illustrative of a real-life line capture scenario, taking place in and on a body of water 55, that is suitable for inventive practice. This example depicts a surface ship 100 towing a subsurface body 200 as an unmanned undersea vehicle (UUV) 400 approaches to attach to a cable 300 at a vehicle attachment point 340. Generally speaking, this type of procedure is known as a "line capture." The physical system may include, for instance, a surface ship 100 towing a depressor 200 attached to a data cable 300. The cable 300 may include, for instance, power and fiber optics encased in a steel sheath. Although a surface vessel is portrayed as the towing platform 100, it is to be understood that inventive practice is possible wherein the towing platform 100 is an underwater vessel.

In order to be traceable by the UUV 400, the tow body may be equipped with a transmitting device, for instance in this case an acoustic transponder. An ultra-short baseline (USBL) system may be included on the UUV 400 to detect the transponder signal, and would determine range and bearing of the UUV 400 to the tow body 200. Using this information, the UUV 400 can guide itself to the cable 300 and attach to the cable 300.

An embodiment of an inventive simulated system may be established in correspondence with a real situation, such as shown by way of example in FIGS. 11 through 16. According to this exemplary inventive embodiment, the ship tow point 130 may be represented either as a prescribed motion (e.g., a straight path, or turns at various speeds or angle rates) or as an empirically based motion (e.g., based on actual ship motions pre-recorded from a vessel and read by the inventive simulation). The cable 300 is defined given physical properties including length, mass, buoyancy, drag, and elasticity. Cable 300 may be homogeneous across its length, or it may have sections of variable properties (e.g. faired and un-faired sections, changing diameter, etc.). The towed body 200 is defined with a variety of hydrodynamic coefficients and mass properties as well as initial conditions to start the inventive simulation. The UUV 400 is defined using similar hydrodynamic coefficients as well as a vehicle controller (which can be tuned within the inventive simulator).

The sensor inputs used in the inventive controller are established to replicate real-world sensors by matching sampling rates and even signal noise. For example, the USBL (used to locate the tow body) would provide range and bearing to the target, but may collect readings at a very low frequency (<1 Hz), while the depth sensor may do so at higher frequencies (>10 Hz). Each of these sampling rates can be defined in the inventive software to more accurately represent the system. The results of this example of an inventive simulation will show body motions, cable catenary, and forces/tensions on each component of the system.

The present invention, which is disclosed herein, is not to be limited by the embodiments described or illustrated herein, which are given by way of example and not of limitation. Other embodiments of the present invention will be apparent to those skilled in the art from a consideration of the instant disclosure, or from practice of the present invention. Various omissions, modifications, and changes to the principles disclosed herein may be made by one skilled in the art without departing from the true scope and spirit of the present invention, which is indicated by the following claims.

What is claimed is:

1. A computer-implemented method for simulating a marine towing-related operation in a graphical programming environment, the method comprising representing components and dynamics of a system characterized by interrelationships, wherein said system components include a towing platform, a towed body, and a tow cable, said tow cable having a first cable end and a second cable end, said tow cable connected to said towing platform at said first cable end, said tow cable connected to said towed body at said second cable end, wherein said system dynamics include:
- an influence exerted upon said tow cable in association with at least one of: a motion of said towing platform; a position of said towing platform; a motion of said towed body; a position of said towed body;
- an influence exerted upon said tow body in association with at least one of: a catenary of said tow cable; a tension of said tow cable;
- wherein said system components further include an underwater vehicle, said underwater vehicle being movable toward or away from said tow cable and being attachable or detachable with respect to said tow cable;
- wherein when said underwater vehicle is attached to said tow cable, said system dynamics further include at least one of: an influence exerted upon said underwater vehicle in association with a catenary of said tow cable; an influence exerted upon said underwater vehicle in association with a tension of said tow cable; an influence exerted upon said tow cable in association with a motion of said underwater vehicle; an influence exerted upon said tow cable in association with a position of said underwater vehicle.

2. The computer-implemented method of claim 1, wherein said system dynamics further include an influence exerted upon said tow body in association with a hydrodynamic character of a marine environment, wherein said hydrodynamic character includes at least one of waves and currents.

3. The computer-implemented method of claim 1, wherein when said underwater vehicle is not attached to said tow cable, said system dynamics include neither an influence exerted upon said underwater vehicle in association with said tow cable, nor an influence exerted upon said tow cable in association with said underwater vehicle.

4. The computer-implemented method of claim 1, wherein said system dynamics further include at least one of: an influence exerted upon said tow body in association with a hydrodynamic character of a marine environment; an influence exerted upon said underwater vehicle in association with a said hydrodynamic character of a marine environment; wherein each said hydrodynamic character includes at least one of waves and currents.

5. The computer-implemented method of claim 4, wherein said system dynamics further include at least one of: an influence exerted upon said tow body in association with a hydrodynamic character of a marine environment; an influence exerted upon said underwater vehicle in association with a said hydrodynamic character of a marine environment; wherein each said hydrodynamic character includes at least one of waves and currents.

6. An apparatus comprising a computer having computer code characterized by computer program logic for simulating a marine towing-related operation in a graphical programming environment, said computer code being executable by said computer so that, in accordance with said computer program logic, said computer performs acts including representing components and dynamics of a system characterized by interrelationships, wherein said system components include a towing platform, a towed body, and a tow cable, said tow cable having a first cable end and a second cable end, said tow cable connected to said towing platform at said first cable end, said tow cable connected to said towed body at said second cable end, wherein said system dynamics include:
- an influence exerted upon said tow cable in association with at least one of: a motion of said towing platform; a position of said towing platform; a motion of said towed body; a position of said towed body;
- an influence exerted upon said tow body in association with at least one of: a catenary of said tow cable; a tension of said tow cable;
- wherein said system components further include an underwater vehicle, said underwater vehicle being movable toward or away from said tow cable and being attachable or detachable with respect to said tow cable;
- wherein when said underwater vehicle is attached to said tow cable, said system dynamics further include at least one of: an influence exerted upon said underwater vehicle in association with a catenary of said tow cable; an influence exerted upon said underwater vehicle in association with a tension of said tow cable; an influence exerted upon said tow cable in association with a motion of said underwater vehicle; an influence exerted upon said tow cable in association with a position of said underwater vehicle.

7. The apparatus of claim 6, wherein said system dynamics further include an influence exerted upon said tow body in association with a hydrodynamic character of a marine environment, wherein said hydrodynamic character includes at least one of waves and currents.

8. The apparatus of claim 6, wherein when said underwater vehicle is not attached to said tow cable, said system dynamics include neither an influence exerted upon said underwater vehicle in association with said tow cable, nor an influence exerted upon said tow cable in association with said underwater vehicle.

9. The apparatus of claim 6, wherein said system dynamics further include at least one of: an influence exerted upon said tow body in association with a hydrodynamic character of a marine environment; an influence exerted upon said underwater vehicle in association with a said hydrodynamic character of a marine environment; wherein each said hydrodynamic character includes at least one of waves and currents.

10. The apparatus of claim 9, wherein said system dynamics further include at least one of: an influence exerted upon said tow body in association with a hydrodynamic character of a marine environment; an influence exerted upon said underwater vehicle in association with a said hydrodynamic character of a marine environment; wherein each said hydrodynamic character includes at least one of waves and currents.

11. A computer program product for simulating a marine towing-related operation in a graphical programming environment, the computer program product comprising a non-transitory computer-readable storage medium having computer-readable program code portions stored therein for execution by a computer, the computer-readable program code portions including:
- a first executable program code portion, for representing components of a system characterized by interrelationships, wherein said components of said system include a towing platform, a towed body, and a tow cable, said tow cable having a first cable end and a second cable end, said tow cable connected to said towing platform at said first cable end, said tow cable connected to said towed body at said second cable end;
- a second executable program code portion, for representing dynamics of said system, wherein said dynamics of said system include:
- an influence exerted upon said tow cable in association with at least one of: a motion of said towing platform;

a position of said towing platform; a motion of said towed body; a position of said towed body;

an influence exerted upon said tow body in association with at least one of: a catenary of said tow cable; a tension of said tow cable;

wherein said system components further include an underwater vehicle, said underwater vehicle being movable toward or away from said tow cable and being attachable or detachable with respect to said tow cable;

wherein when said underwater vehicle is attached to said tow cable, said system dynamics further include at least one of: an influence exerted upon said underwater vehicle in association with a catenary of said tow cable; an influence exerted upon said underwater vehicle in association with a tension of said tow cable; an influence exerted upon said tow cable in association with a motion of said underwater vehicle; an influence exerted upon said tow cable in association with a position of said underwater vehicle.

12. The computer program product of claim 11, wherein said system dynamics further include an influence exerted upon said tow body in association with a hydrodynamic character of a marine environment, wherein said hydrodynamic character includes at least one of waves and currents.

13. The computer program product of claim 11, wherein when said underwater vehicle is not attached to said tow cable, said system dynamics include neither an influence exerted upon said underwater vehicle in association with said tow cable, nor an influence exerted upon said tow cable in association with said underwater vehicle.

14. The computer program product of claim 11, wherein said system dynamics further include at least one of: an influence exerted upon said tow body in association with a hydrodynamic character of a marine environment; an influence exerted upon said underwater vehicle in association with a said hydrodynamic character of a marine environment; wherein each said hydrodynamic character includes at least one of waves and currents.

15. The computer program product of claim 14, wherein said system dynamics further include at least one of: an influence exerted upon said tow body in association with a hydrodynamic character of a marine environment; an influence exerted upon said underwater vehicle in association with a said hydrodynamic character of a marine environment; wherein each said hydrodynamic character includes at least one of waves and currents.

\* \* \* \* \*